No. 867,838. PATENTED OCT. 8, 1907.
J. E. ROCKEY.
STOVE.
APPLICATION FILED AUG. 3, 1904.
2 SHEETS—SHEET 1.
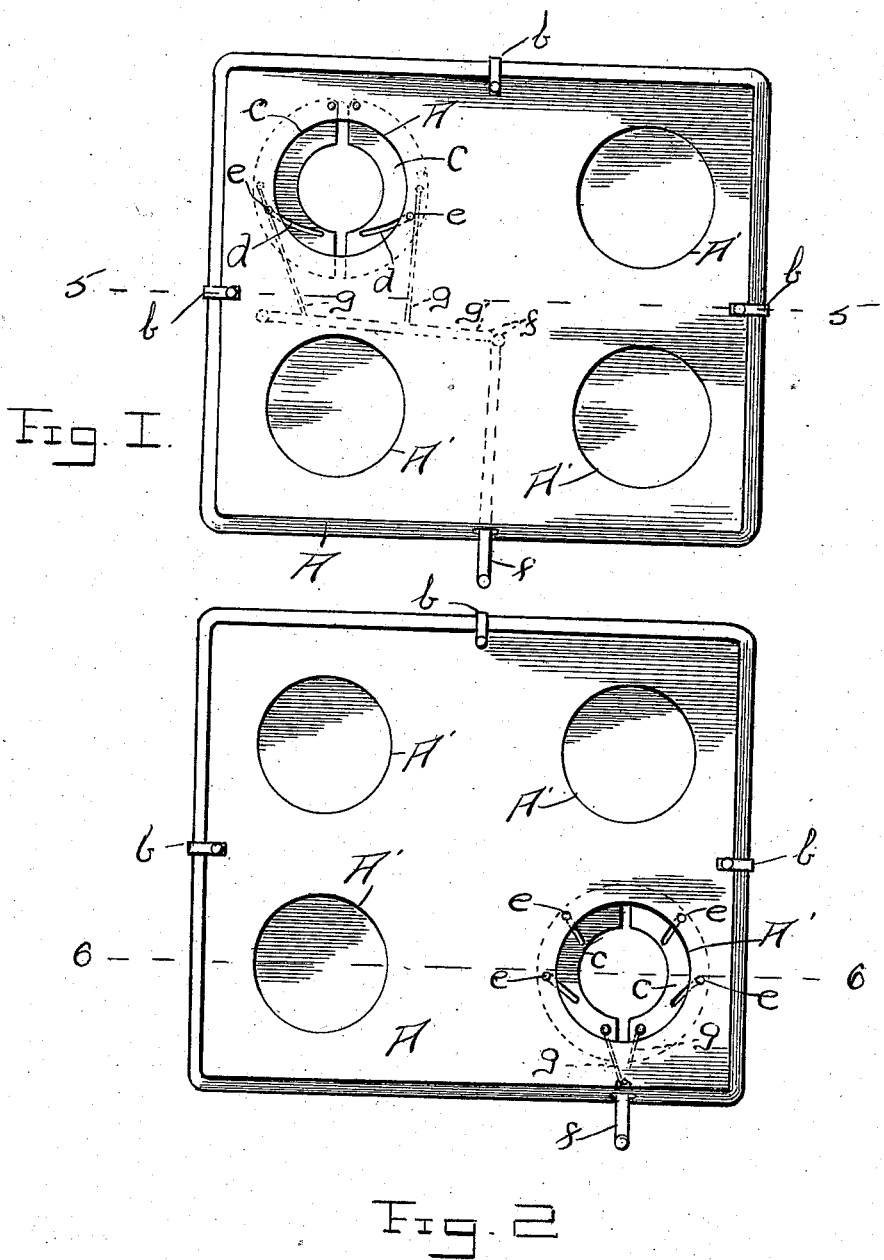

No. 867,838. PATENTED OCT. 8, 1907.
J. E. ROCKEY.
STOVE.
APPLICATION FILED AUG. 3, 1904.

2 SHEETS—SHEET 2.

Witnesses
J. C. Simpson
F. G. Smith

Inventor
J. E. Rockey.
By
Attorneys

UNITED STATES PATENT OFFICE.

JAMES E. ROCKEY, OF COLORADO SPRINGS, COLORADO.

STOVE.

No. 867,838.   Specification of Letters Patent.   Patented Oct. 8, 1907.

Application filed August 3, 1904. Serial No. 219,395.

*To all whom it may concern:*

Be it known that I, JAMES E. ROCKEY, a citizen of the United States, residing at Colorado Springs, in the county of El Paso, State of Colorado, have invented certain new and useful Improvements in Stoves; and I do hereby declare the following to be a full, clear, and exact description of the invention, such as will enable others skilled in the art to which it appertains to make and use the same.

This invention has relation to stove-covers, such, particularly as are used during the summer or hot weather or in cottages or anywhere that it is desirable to get all the use, comfort, and convenience from a relatively small stove at a minimum cost.

I propose to show my invention as applied to two and four hole stoves of the gas or gasolene kind, though it will be apparent that it may be used on other types of stoves, and I propose to make all the use of my invention of which it is capable.

The invention consists in making the holes of the stove adjustable so as to suit pans or kettles of varying size and to retain or save heat of the stove, as far as possible, for keeping cooked victuals hot, and for cooking uncooked things.

The purpose of my invention, other than those already given, is that it is a gas or gasolene saver, in that while one burner is being used for the cooking of victuals the cover retains sufficient heat so that other food may be warmed or cooked with this same flame, thus making it an article of economy, and at the same time avoid burning or scorching foods which so frequently happens directly over the flame.

The drawings hereto annexed and the letters of reference marked thereon form a part of this specification and the same is to be viewed in the reading thereof.

Figures 3, 4:
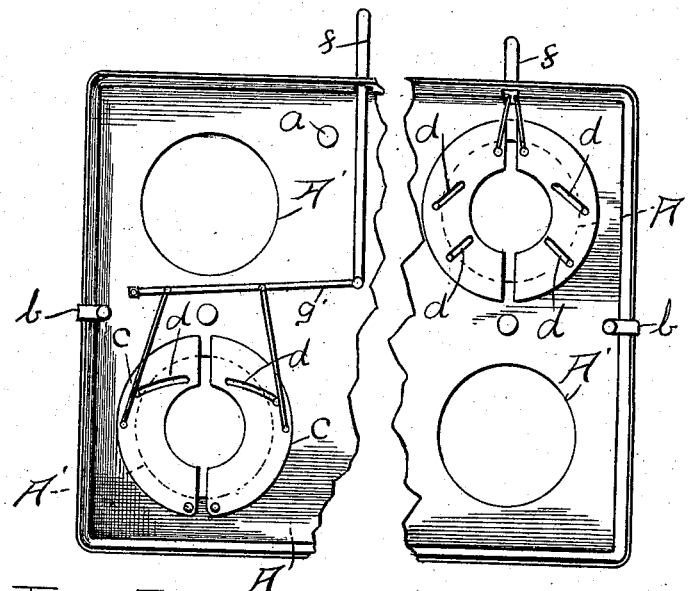
Figure 5:
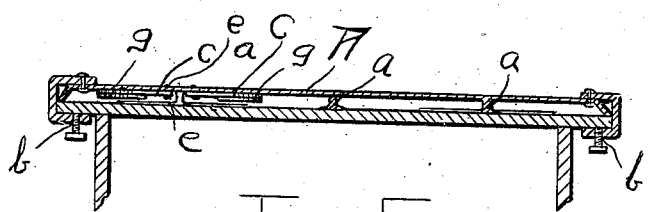
Figure 6:
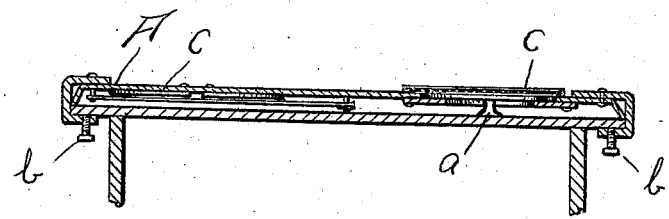

Of the drawings, Figure 1 is a top plan view of a stove cover showing one form of my invention for regulating the size of the openings therein, Fig. 2 is a similar view showing another form of the invention, Fig. 3 is a bottom plan view of the first-mentioned form of my invention, Fig. 4 is a bottom plan view of the last-mentioned form of my invention, Fig. 5 is a detail vertical longitudinal sectional view on the line 5—5 of Fig. 1, and, Fig. 6 is a view similar to Fig. 5 taken on the line 6—6 of Fig. 2.

In the drawings, A designates a sheet of metal, preferably of steel, of the size of the top of the stove, or it may be somewhat larger with the edges curled down all around and provided with short legs *a* so as to hold the cover a short distance above the top of the stove proper. These legs may be as many or as few as desired. The cover A is clamped to the stove at the points marked *b* to hold it in place, and at opposite sides of one or more of the holes, for the reception of the pots or pans there are arranged segmental slides *c* provided with suitably formed slots *d* having the shanks of headed rivets *e* or the like passed through them and fastened to the stove top, so that the slides may be moved toward the holes A′ and, as it were, reduce the size of the holes, or the slides may be moved outward, and so open the hole to the fullest extent.

For operating the slide adjacent the front edge of the stove, a slide-rod *f* is provided, to which and the said slide are attached links *g*. In order to operate the slides adjacent the rear edge of the stove, I attach the links *g* to a pivoted arm *g′* which is operated by a slide-rod *f*.

In Figs. 5 and 6, I have shown a way in which the legs may be secured to the cover and also in which the segmental slides *c* may be connected thereto, but any other manner suited to the purpose will answer.

My invention, as before said, is more especially adapted to summer stoves used in cottages, or where it is desired to confine the heat to the stove, and in any case get along with as little as possible.

Steel or asbestos disks may be used to cover the holes not in use in order to prevent the escape of heat, so that it may be held within the top of the stove, and thus require less flame.

What is claimed is:—

A stove cover comprising a sheet of material having holes formed therein coinciding with the holes in the top of a stove, plates arranged upon the under side of the cover for movement to and from each other to increase or decrease the size of the openings in the cover, said plates being slotted, and headed pins carried by the cover and extending through the slots in the plates for supporting and guiding the same, a push rod carried by the cover and having a handle portion extending beyond one edge of the cover, and rods connecting both of the plates with the push rod.

In testimony whereof, I affix my signature, in presence of two witnesses.

JAMES E. ROCKEY.

Witnesses:
ARTHUR C. WILLIAMS,
FRANK J. WATERS.